United States Patent [19]

Morgan et al.

[11] Patent Number: 4,627,296
[45] Date of Patent: Dec. 9, 1986

[54] SHUNT CALIBRATION SYSTEM FOR A TRANSDUCER MOUNTED ON A ROTATING MEMBER

[75] Inventors: Paul W. Morgan, Pontiac; Kish Amlani, Troy, both of Mich.

[73] Assignee: Eaton Corporation, Cleveland, Ohio

[21] Appl. No.: 431,066

[22] Filed: Sep. 30, 1982

[51] Int. Cl.⁴ .................................................. G01L 3/02
[52] U.S. Cl. .................................. 73/862.33; 73/1 C; 73/862.35
[58] Field of Search .................... 73/862.35, 1 B, 1 C, 73/862.33

[56] References Cited

U.S. PATENT DOCUMENTS 3,797,305  3/1974  Haskell ............................ 73/1 C X
3,850,030  11/1974  Adler ................................ 73/862.35

FOREIGN PATENT DOCUMENTS 2507883  8/1975  Fed. Rep. of Germany ... 73/862.35

Primary Examiner—Charles A. Ruehl
Assistant Examiner—Brian R. Tumm
Attorney, Agent, or Firm—C. H. Grace; R. A. Johnston

[57] ABSTRACT

A rotary transformer transducer system includes a rotatable shaft having a rotor and a transducer each mounted thereon, and a stationary member including a stator, with the rotor and stator coupling electrical energy therebetween without physical contact. A resistor mounted on the rotatable shaft is selectably switched to provide direct shunt calibration of the transducer without physical contact with the stationary member. A solid state switch, mounted on the shaft couples the resistor to the transducer. The switch is operated by a pulse coded signal coupled in the reverse direction through the rotary transformers normally provided to transmit the transducer signals.

8 Claims, 6 Drawing Figures

SHUNT CALIBRATION SYSTEM FOR A TRANSDUCER MOUNTED ON A ROTATING MEMBER

BACKGROUND

1. Field

This invention relates to shunt calibration systems for transducers and, more particularly, to improvements in such systems in which rotary transformers are used to couple excitation and signal to and from a transducer mounted on a rotating member.

2. Prior Art

Rotating shaft torque transducers often utilize the maintenance advantages of rotary transformers for signal transfer. Rotating transformers differ from conventional transformers only in that either the primary or secondary winding is rotating. Such rotary transformers are generally described in U.S. Pat. No. 3,611,230 entitled "Rotary Transformer Structure". In applications where a strain gage transducer employing a Wheatstone bridge circuit is placed on a rotating member, a first rotary transformer is used only to transmit an AC bridge supply voltage (referred to as the excitation voltage) to the bridge, while a second transformer is used to pick off the output voltage, referred to as the signal voltage. Thus, through the use of the rotating transformers, slip rings are eliminated and there is no direct contact between the rotating and stationary elements of the sensor. Although this isolation is advantageous, it requires an external or dummy bridge, or a ground reference network, as disclosed in U.S. Pat. No. 3,790,811 to be used on the instrument side of the transformers. This circuitry provides a current return path for the AC carrier instruments generally used in transducer systems to properly monitor the output of the transducer.

A more complete understanding of rotary transformer systems as used in conjunction with transducers may be gained with the aid of FIGS. 1 and 2. Referring first to FIG. 2, a generalized transducer system is shown in which a carrier or source of alternating current 206 is coupled to the primary winding 208 of the first transformer 201. For ease of reference, this is referred to as the system excitation. The secondary winding 210 of the second transformer 204 couples the output voltage to an output or utilization device 207. This is referred to as the system signal. It must be appreciated at this time that a single "instrument" can provide the function of a carrier and a utilization device and in fact such instrument may be calibrated to provide an output reading of the property to be measured by the transducer system.

Referring to FIG. 1, a transducer system is illustrated for measuring the torque on a rotatable shaft 101. The excitation supply to the input of the system is coupled to the transducer on shaft 101 by a first transformer 102. Transformer 102 includes a stationary or primary winding 103 receiving power from a connecting block 104 and a rotatable or secondary winding 105 connected to a strain gage transducer 106. Also shown is a second transformer 107 having a rotatable or primary winding 110 coupled to the transducer and a stationary or secondary winding 108 transmitting an output signal to the connecting block 104. Both the transformers and the transducer are contained within a housing 109.

When a rotary transformer system is utilized in conjunction with a strain gage bridge to measure the torque on the shaft, it is desirable to calibrate the bridge relative to the electrical instrumentation. Such calibration is necessary because of normal variations in the electrical equipment which provides the multiple functions of supplying the excitation to the bridge and which receives the output signal from the bridge. In addition, it is sometimes desirable to calibrate the equipment while the shaft is rotating.

To calibrate a strain gage bridge, a well known technique is to apply a resistor across one leg of the bridge. This technique is called shunt calibration because the resistor is connected in shunt or parallel across a leg of the bridge.

Prior to the present invention, calibration of the transducer in a rotary transformer system was very complex. The dummy bridge permitted a convenient method of performing a shunt calibration that is otherwise not possible on the shaft. This method of shunt calibration which is external to or removed from the rotating transducer is, in general, valid; however, it has certain limitations which restrict its use to controlled conditions which are difficult to obtain in actual practice.

Input impedance unbalance, found in some instruments, necessitates the use of a resistor-capacitor correction network with the dummy bridge. With an external shunt calibration system, the simulated shunt phase and the actual signal phase are frequency dependent and usually will not match. The shunt signal must be shifted to be in phase with the actual signal at the carrier drive frequency. This is accomplished by adjusting the values of the R-C network. The frequency sensitivity of this system limits its usefulness.

A prior art technique designed to overcome the disadvantages of the dummy bridge method of calibration is described in U.S. Pat. No. 4,059,005. In this technique, use is made of a magnetically actuated switch, mounted on the rotating shaft which is activated by introducing a magnetic field of sufficient strength. The switch, which is placed in series with a calibration resistor to connect it in parallel with an appropriate leg of the bridge, can be activated and used in static and dynamic conditions, regardless of shaft position by utilizing magnetically conductive rings.

The magnetically actuated switch technique uses many of the usual circuit components associated with measurements on rotating equipment. The circuitry of this technique will be dealt with in detail here because it provides a foundation for the present invention and it clearly shows the advantages of the present invention in eliminating the complication and cost of this prior art approach.

FIG. 3 illustrates a rotary transformer transducer system which is arranged to measure the torque of a rotatable shaft 308 and incorporates a magnetic switching system for calibration. The input signal is coupled to the shaft by a transformer 201 having a stationary winding 302, connected to block 301, and a rotatable winding 303 connected to a strain gage transducer 304 which incorporates a bridge. The output is taken from the bridge by a second transformer 204 having a rotatable winding 306 connected to the transducer and a stationary winding 305 connected to the connector block 301.

A schematic representation of this system is shown in FIG. 5 with the components on the left of the dash line being mounted on the rotating shaft 308 and the components to the right of the dash line being mounted in the stationary housing 307. Specifically, stationary windings 302 and 305, provide the system input and output respectively. These windings are secured within the housing 307 on the stationary side, while rotating windings 303 and 306 and the strain gage transducer 304 are all mounted on and rotate with the shaft 308. The strain gage transducer 304 is a bridge circuit which includes four legs 501 through 504.

The above described circuitry is common to most rotational torque measurement systems, however, it is the magnetically responsive switch that distinguishes this technique from other prior art approaches. In this embodiment, a shunt impedance 319, preferable a resistor, is selectively connectable across a first part of the strain gage bridge such as across leg 501 from a first terminal 505, defined as the junction of legs 501 and 504, through a magnetically responsive switch, such as a reed switch 309, and then to the common connection between legs 501 and 502 of the bridge. Upon closing switch 309 the impedance 319 is connected across leg 501. In order to actuate reed switch 309, an electromagnet 512 is provided having pole faces 511 and 516. Energization of magnet 512 closes switch 309 to couple the impedance 319 across leg 501, while de-energization of the magnet permits the reed switch contacts to open. Thus, reed switch 309 is a normally open type of hermetically sealed reed switch.

If a single reed switch 309 is secured to the rotatable shaft 308, when the reed switch is 180° away from the pole faces of the electromagnet, a stronger magnetic flux density is required to close the contacts of the reed switch than when switch 309 is adjacent the pole faces. Thus, the switch is position-sensitive, i.e., its distance away from the magnets may cause it to be free of influence from the magnetic field.

To eliminate position sensitivity and to minimize the effect of other variables such as shaft speed, shaft diameter, reed switch characteristics and magnet configuration, this prior art approaches uses three reed switches, 309, 309A and 309B, as illustrated in FIG. 4, each of which is electrically connected in parallel and supported by a ring assembly 310 and 312. The pole faces 511 and 516 of the magnet are positioned to oppose the steel rings. Thus, upon energization of the magnet 512, the steel rings concentrate the magnetic flux to assure that at least one reed switch closes.

The foregoing provides single shunt calibration i.e., positive or negative. However, if both positive and negative shunt calibration are desired, then the structure must include all the elements of FIG. 4. Specifically, ring 311 and switches 313, 313A and 313B. A second electromagnet 513 having pole faces 514 and 515 is provided as in FIG. 5 to actuate the second series of reed switches. This places the resistor 319 across leg 504 of the bridge.

The positive and negative shunt calibration method described above is preferred over the dummy bridge method because in the dummy bridge method both transformers are required to be perfect or their deficiencies must be compensated for this method to provide accurate results.

Although the reed switching method does permit direct application of the shunt calibration resistor to a transducer, the complication in realizing this advantage is quite significant. Multiple switches and magnetic rings are required. In addition, it has been found that on acceleration of the shaft to which the reed switches are mounted, unintentional closure of the switches occurs, resulting in erratic measurement results.

SUMMARY

It is an object of the present invention to provide a direct shunt calibration system which is not affected by rotational acceleration for a transducer positioned on a rotating shaft.

It is a further object of the present invention to provide a shunt calibration system for a transducer on a rotating shaft which does not require a separate magnetic coupling means to control the application of the shunt impedance to the transducer.

In the present invention, an encoded signal is transmitted through a rotary transformer normally used to pass the transducer output signal. The encoded signal is accepted by a decoding network sensitive to the encoded signal, but which is not sensitive to the normal transducer output signal. The decoding network is programmed to actuate solid state switches in accordance with a preselected sequence which, in turn, provides both positive and negative calibration of the transducer as well as disengagement of the calibration impedance to free the transducer for normal measurement purposes.

BRIEF DESCRIPTION OF THE DRAWINGS

The various objects and advantages of the present invention will become more apparent upon reading the following detailed description of the invention taken in conjunction with the drawings. In the drawings, wherein like reference numerals identify corresponding components.

DETAILED DESCRIPTION OF THE INVENTION

For a full understanding of the invention, reference will be made to one environment in which the invention has particular utility. The environment is a transducer system for measuring torque of a rotating member. It must be appreciated, however, that once the broad principles of the present invention are understood, the invention may be utilized in other environments.

Figure 1:
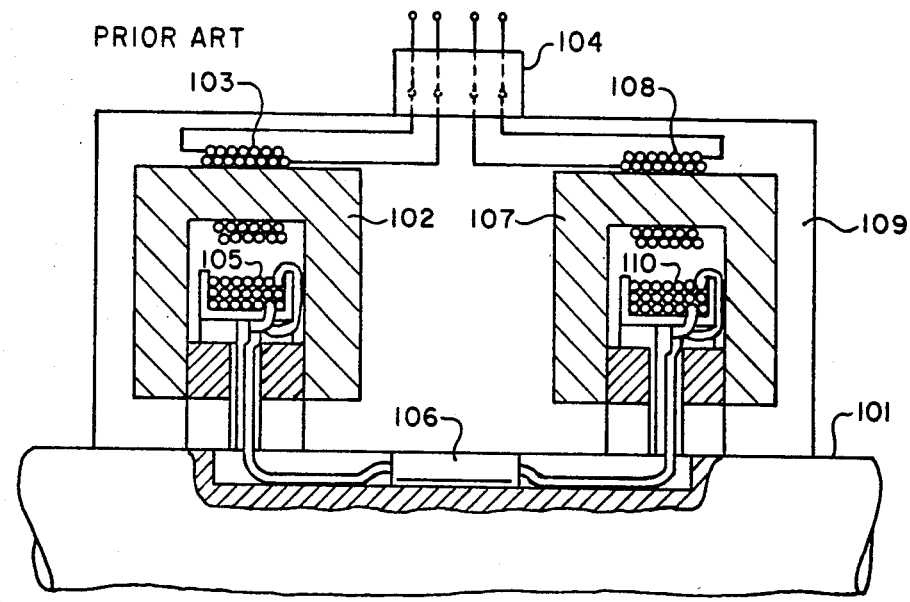
FIG. 1 is an illustration, partly in cross-section, of a transducer system wherein the invention may be employed.
Figure 2:
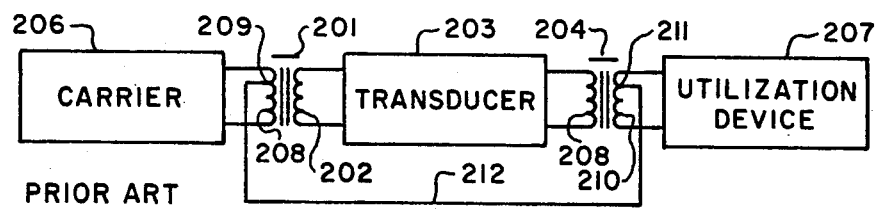
FIG. 2 is a schematic illustration of the fundamental operation of rotating transformers used in a rotating transducer system.
Figure 3:
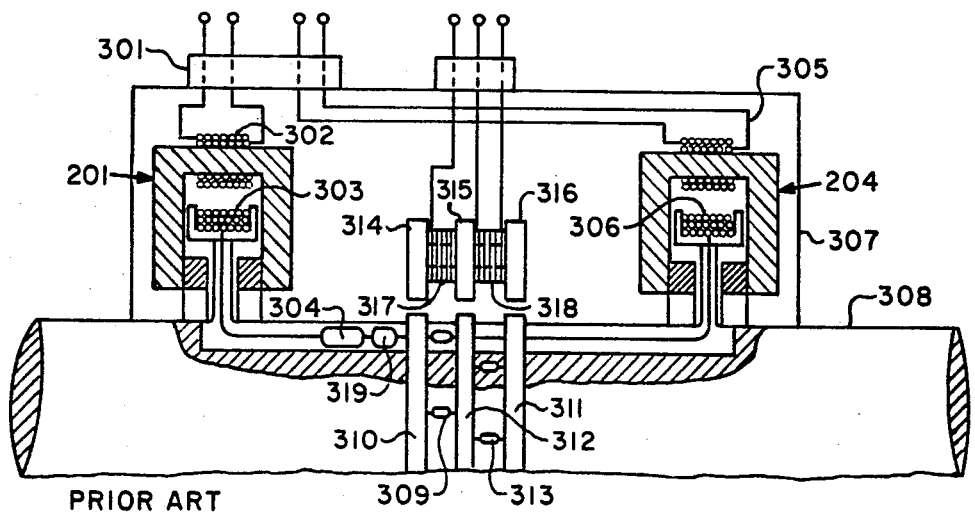
FIG. 3 is an illustration, partly in cross section, of a transducer system using rotating transformers for signal coupling and magnetic switches for a shunt calibration.
Figure 4:
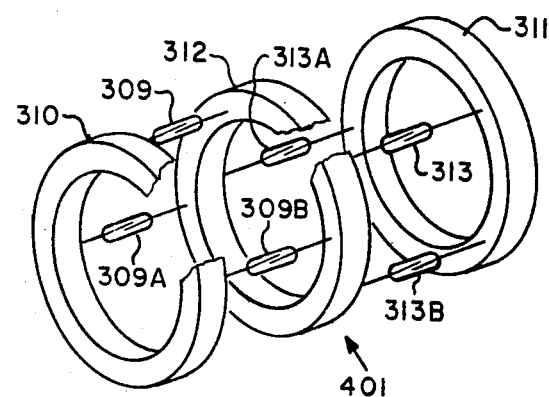
FIG. 4 is a perspective drawing of a magnetic switch and ring assembly for the system of FIG. 3.
Figure 5:
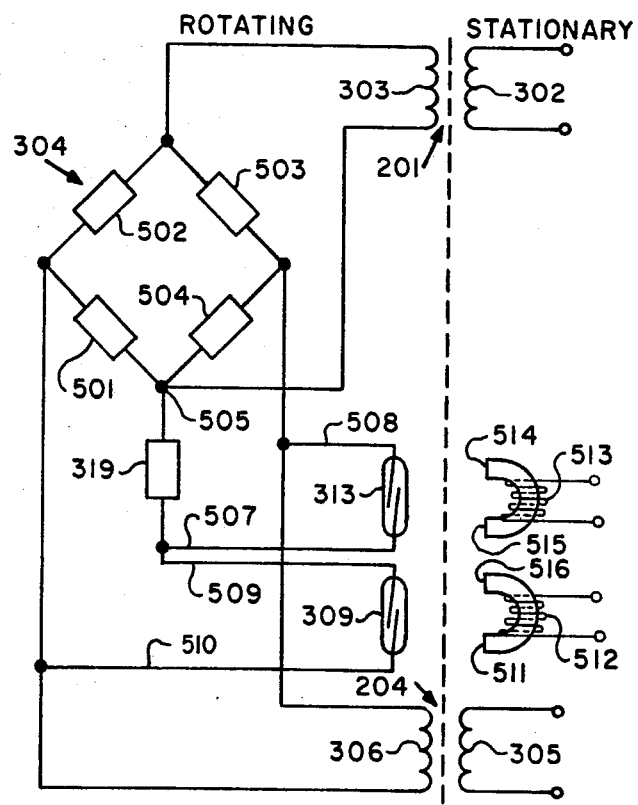
FIG. 5 is a schematic representation of a prior art calibration system using rotary transformers for signal coupling.
Figure 6:
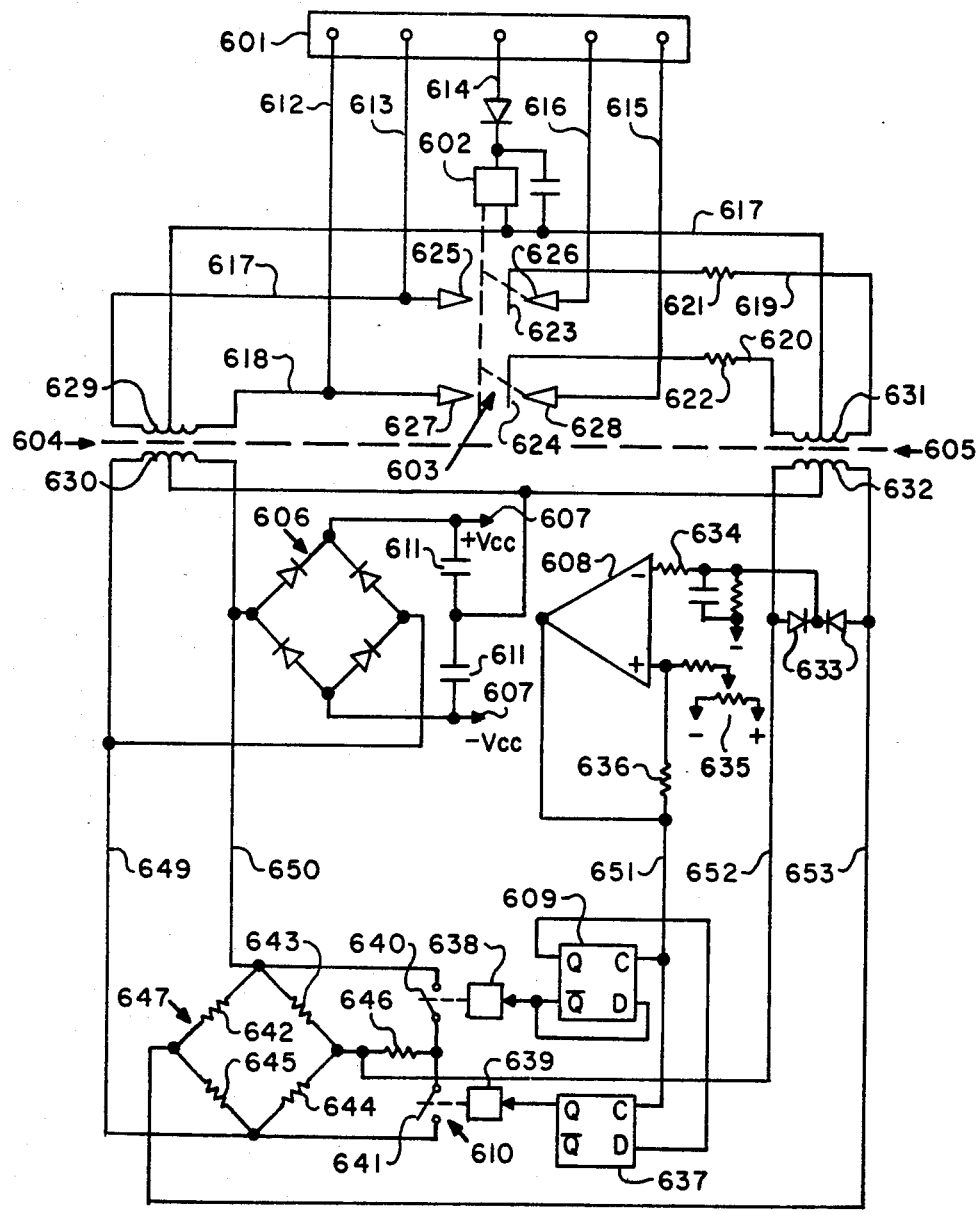
FIG. 6 is a schematic diagram of the present invention showing a pulse generating and a sequential control circuit used for shunt calibration.

FIG. 6 is a schematic diagram of a transducer system employing the present invention. In a number of aspects, this system is similar to the prior art system shown in FIG. 5 and discussed above. Fundamentally, an excitation signal received at the block 601 is coupled to the excitation rotary transformer 604 where it is passed to a Wheatsone bridge 647. The resulting output signal from the Wheatstone bridge is then passed to a signal transformer 605, which transmits it back to the block 601 for further transmission to a utilization or metering circuit. A shunt calibration resistor 646 is switched by means of switch 610 to provide either positive or negative shunt calibration of the bridge 647.

The complete system shown in FIG. 6 includes a block 601, a switch 603, a driver circuit 602 for the switch 603, a rotary excitation transformer 604, having a stationary primary 629, and a rotating secondary 630, rotary signal transformer 605 having a stationary secondary 631, and a rotating primary 632, a full wave bridge 606 having an output filter circuit 611, and positive and negative output terminals 607, a Wheatstone bridge 647 having arms 642 through 645, a shunt calibration resistor 646, a shunt calibration switch 610 having poles 640 and 641, and driver circuit 638 and 639, a sequential logic circuit formed of D-flip-flops 609 and 637, a calibration decoding network formed of diodes 633, filter network 634, operational amplifier 608, threshold level adjustment potentiometer 635, and amplifier feedback resistor 636.

In the operation of this system an alternating current excitation voltage is fed through block 601 to lines 612 and 613 which supply the excitation voltage to the primary of the excitation transformer 629. The excitation voltage is coupled through the excitation transformer 604 to its secondary 630 where it is supplied to the input of the Wheatstone bridge 647 and also to the input of the full wave bridge 606. The full wave bridge converts the excitation voltage to both a positive and negative direct current voltage at terminal 607 to supply bias to the operational amplifier, the threshold potentiometer, the driver circuit and the D-flip-flops. The signal from the output of the Wheatstone bridge is carried on line 652 and 653 to the primary of the signal transformer 632 where it is coupled to the secondary 631 and fed to the poles 623 and 624 of the switch 603. The poles 623 and 624 are positioned to the right, contacting points 626 and 628 in the normally de-energized position. This couples the signal out on lines 615 and 616 to the block 601 for further transmission to a metering instrument.

When it is desired to use the shunt calibration circuitry, a signal is supplied through the block 601 to line 614 which actuates the control circuitry for the switch 603, causing the poles 623 and 624 to shift to the left where they make connection with contacts 625 and 627. Contacts 625 and 627 are connected to input line 612 and 613 which carry the full excitation voltage supplied to the system. The excitation voltage is fed through the poles and series resistor 621 and 622 to the secondary 631 of transformer 605. In this instance, the secondary 631 functions as a primary, receiving a large excitation voltage in comparison to the signal produced at the output of the Wheatstone bridge. The excitation is then coupled through the signal transformer to what is normally the primary 632, but which, in this instance, functions as a secondary. The excitation voltage at winding 632 is detected by the diodes 633 and supplied to the operational amplifier 608 by way of the filter network 634. This voltage is significantly higher than that produced by the signal output of the Wheatstone bridge. When this voltage is sufficiently high to exceed the threshold level set by potentiometer 635, it is passed to a decoding network formed of flip-flops 609 and 637.

In the normal operation of a D-flip-flop, a pulsed signal comprising a positive going leading edge is supplied to the C port. If a "one" is present at the D-input prior to the arrival of a positive leading edge into the C port, the Q output will transition to and remain at the "one" state until it receives another positive leading edge after a "zero" is present at D-input.

The flip-flops 609 and 637 are connected to operate in the following manner upon receiving a pulse. The first pulse causes the control circuit 638 to actuate causing switch 640 to close. This places the shunt calibration resistor 646 across arm 643 of the Wheatstone bridge. A second pulse causes the switch control circuit 638 to de-energize, releasing the pole 640 while the control circuit 639 is energized, causing the pole 641 to close. This places the shunt calibration resistor 646 across arm 644. A third pulse causes the flip-flops to release both arms 640 and 641, disconnecting the shunt calibration resistor entirely and freeing the bridge for its normal measurement function. It should be noted that the signal received on line 614 need only be pulses because the D-flip-flops remain in whatever state they are left in by the last pulse command. The switches 640 and 641 are normally field-effect transistors which can be driven directly by the D-flip-flops 609 and 637. These switches are unaffected by rotation, thereby providing a significant advantage over the prior art magnetic switches.

The foregoing is a description of a preferred embodiment of the present invention for isolating a shunt calibration impedance by placing the impedance on the rotatable member of a transducer system using rotary transformers for excitation and signal transmission and by providing pulse generating means on the stationary portion of the system to transmit encoded switching commands through a rotary transformer to control the connection of the shunt calibration impedance. Various modifications may be made without departing from the spirit and scope of the present invention. The invention, therefore, should be limited only by the scope of the following claims.

Having described our invention, we claim:

1. In a transducer system including a rotatable shaft, a transducer mounted on said rotatable shaft, a rotary transformer means including a rotor member operatively associated with said rotatable shaft for rotation therewith and a stationary stator member, said rotary transformer means coupling a transducer output signal between said rotor member and said stator member without physical contact, the improvement of a selectively operable shunt calibration system comprising:

a. impedance means secured to said rotatable shaft for rotation therewith,
   b. switch means mounted on said rotatable shaft for rotation therewith, said switch means operable for coupling said impedance means across at least a first part of said transducer,
   c. means for generating first and second encoded signals and transmitting the first and second encoded signals from the stator member to the rotor member through said rotary transformer means to control the actuation of the switch means, and
   d. switch actuating means mounted on said rotor member for operating said switch means and said switch actuating means being connected to receive the first and second encoded signals and said transducer output signal, said first and second encoded signals being distinguished from said transducer output signal by amplitude, said switch actuating means causing said switch means to couple and decouple said impedance means to at least said first part of said transducer in accordance with the first and second encoded signals, said first and second encoded signals being pulse encoded and being distinguished from one another by time sequence.

2. The invention as defined in claim 1, wherein the means for generating first and second encoded signals also produces a third encoded signal distinguished by time sequence from the first and second encoded signals, said switch means being further capable of coupling said impedance means across a second part of said transducer and said switch actuating means causes the switch means to couple the impedance means across the second part of the transducer in response to the third encoded signal.

3. The invention as defined in claim 2, wherein said rotary transformer means includes a first rotary excitation transformer for coupling an excitation signal to the transducer, and a second rotary signal transformer for coupling the transducer output signal from the transducer, and wherein the first, second and third encoded signals are generated in time sequence by momentarily connecting the excitation signal to the second rotary signal transformer, the switch actuating means being connected to the second rotary signal transformer to receive the first, second and third encoded signals generated by momentarily connecting the excitation signal to the second rotary signal transformer and being operable to distinguish said first, second and third encoded signals from the transducer output signal by way of amplitude.

4. The invention as claimed in claim 3, wherein the switch means is a solid state switch.

5. The invention as claimed in claim 4, wherein the switch means is a field-effect device.

6. A transducer system including a rotatable shaft, a transducer mounted on said rotatable shaft, rotary transformer means including a rotor member for rotation with said rotatable shaft and a stationary stator member, said rotary transformer means coupling an output signal of said transducer between said rotor member and said stator member without physical contact, and an improvement of a calibration system comprising:

a. calibration means rotatable with said shaft for altering said transducer in a known manner for calibration purposes, when connected with said transducer, b. switch means rotatable with said shaft and operable for connecting said calibration means with said transducer, c. means connected with said stator member for generating a calibration control signal transmittable through said rotary transformer means from the stator member to the rotor member to control the actuation of said switch means, said calibration control signal being of greater amplitude than said transducer output signal, and d. amplitude discrimination means rotatable with said shaft for receiving said calibration control signal from said rotary transformer means, said amplitude discrimination means being responsive to said calibration control signal and rejecting said transducer output signal on the basis of the greater amplitude of said calibration control signal, said amplitude discrimination means having an output connected with said switch means for actuating said switch means for calibration control purposes, whereby said calibration control signal and not said transducer output signal is capable of controlling calibration of the transducer, despite commonality of said roatry transformer means in transmitting both the calibration control signal and the transducer output signal.

7. A transducer system as defined in claim 6 wherein said switch means is operable for connecting said calibration means with said transducer for altering said transducer both positively and negatively from the quiescent operating point of said transducer.

8. A transducer system as defined in claim 7 wherein said calibration means includes a resistor, said transducer includes a bridge circuit having first and second legs and said switch means is operable to connect said resistor across said first leg of said bridge circuit for altering said transducer positively from its quiescent operating point and operable to connect said resistor across said second leg of said bridge circuit for altering said transducer negatively from its quiescent operating point.

* * * * *